United States Patent [19]
Garrison

[11] Patent Number: 5,589,025
[45] Date of Patent: *Dec. 31, 1996

[54] I D CARD INTERMEDIATE AND METHOD

[75] Inventor: Ronald R. Garrison, Batavia, Ill.

[73] Assignee: Wallace Computer Services, Inc., Lisle, Ill.

[*] Notice: The term of this patent shall not extend beyond the expiration date of Pat. No. 5,466,013.

[21] Appl. No.: 512,988

[22] Filed: Aug. 9, 1995

Related U.S. Application Data

[63] Continuation of Ser. No. 159,294, Nov. 30, 1993, abandoned.

[51] Int. Cl.$^6$ .............................. B32B 31/18; B92D 15/00
[52] U.S. Cl. .................. 156/268; 156/247; 156/277; 156/297; 283/75; 283/101; 283/107; 283/108; 283/109
[58] Field of Search .................... 156/247, 248, 156/268, 277; 40/1.5, 299, 360; 283/62, 101, 107, 108, 109, 75; 428/40.1, 41.8, 42.1, 42.2, 42.3

[56] References Cited

U.S. PATENT DOCUMENTS

| | | | |
|---|---|---|---|
| 2,255,019 | 9/1941 | Wolters et al. | 156/268 |
| 3,166,186 | 1/1965 | Karn | 428/42 |
| 3,996,679 | 12/1976 | Warneke | 40/1.5 |
| 4,248,919 | 2/1981 | Davis | 40/299 X |
| 4,479,838 | 10/1984 | Dunsirn et al. | 156/247 |
| 4,508,365 | 4/1985 | Hawes | 283/62 X |
| 4,523,825 | 6/1985 | Norris | 354/301 |
| 4,544,590 | 10/1985 | Egan | 283/101 X |
| 4,863,772 | 9/1989 | Cross | 156/248 X |
| 4,925,716 | 5/1990 | Haas | 40/1.5 X |
| 5,042,842 | 8/1991 | Green et al. | 283/101 |
| 5,129,682 | 7/1992 | Ashby | 283/101 X |
| 5,209,514 | 5/1993 | Hebert | 428/42.1 X |
| 5,219,183 | 6/1993 | McKillip | 283/101 X |
| 5,413,532 | 5/1995 | Raby . | |
| 5,462,488 | 10/1995 | McKillip | 283/101 X |
| 5,466,013 | 11/1995 | Garrison | 283/109 X |

FOREIGN PATENT DOCUMENTS 2121896   5/1990   Japan .

*Primary Examiner*—David A. Simmons
*Assistant Examiner*—M. Curtis Mayes
*Attorney, Agent, or Firm*—Tilton, Fallon, Lungmus & Chestnut

[57] ABSTRACT

An I D card intermediate which includes a business form having one or more I D cards diecut into it and backed by a laminate of multi-ply film.

3 Claims, 1 Drawing Sheet

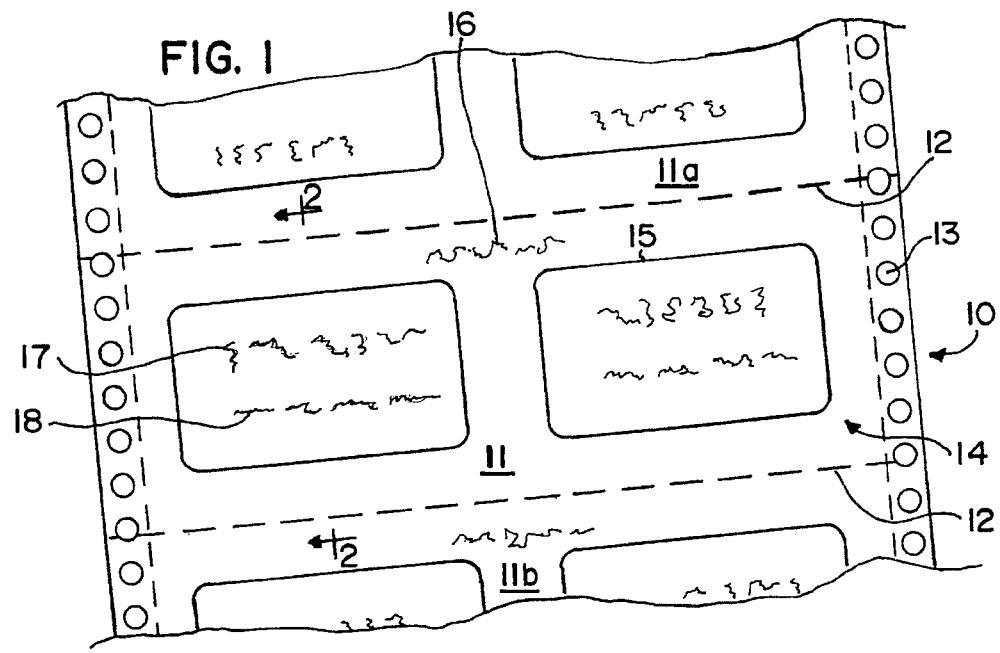
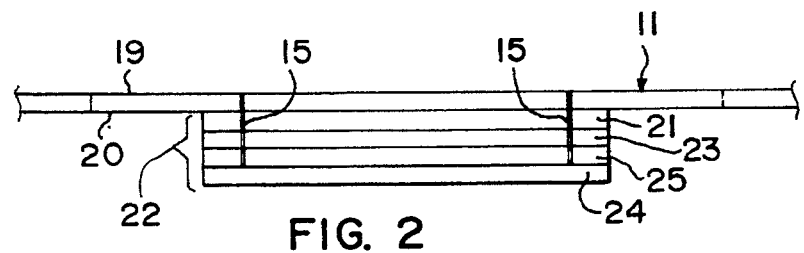
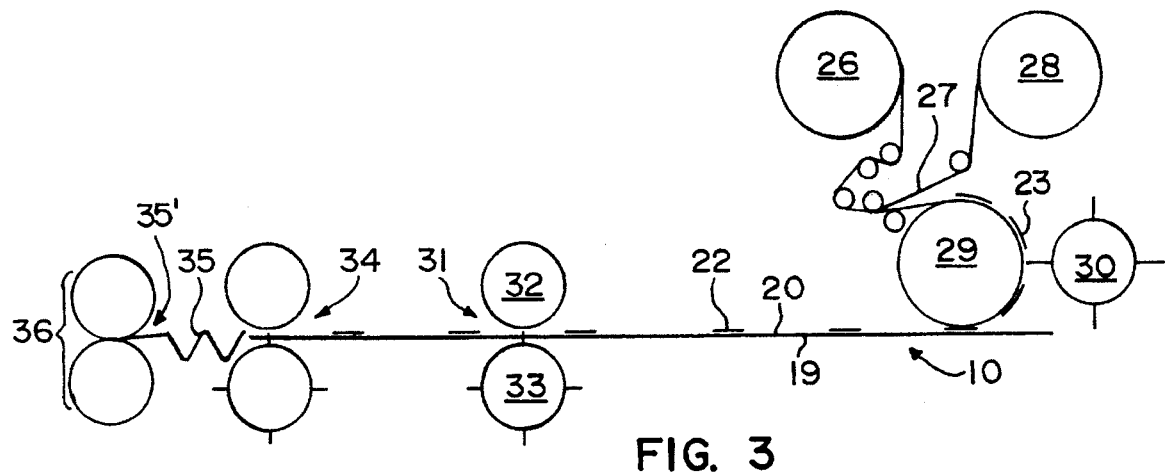

I D CARD INTERMEDIATE AND METHOD

This application is a continuation of application Ser. No. 08/159,294, filed Nov. 30, 1993 now abandon.

BACKGROUND AND SUMMARY OF INVENTION

This invention relates to an I D card intermediate and method and, more particularly to an intermediate which includes a two film ply laminate on a length of card-providing paper.

Currently, I D cards as provided by the sponsoring company-store, insurance company, etc. —are provided as part of a business form and detachable therefrom by the intended user. These card-equipped forms are of two types. One type has the card "tipped on", i e adhesively secured to one surface. This has the disadvantage of developing a substantial thickness so that laser printing, for example, is virtually prohibited. The other tip has a sheet perforated to define an I D card. Although this avoids the thickness problem, it substitutes another in the form of the perforation bonds which give the card a rough feeling edge. Both problems are avoided by the invention.

According to the invention, an I D card intermediate is provided which includes a length of paper having top and bottom surfaces and a generally rectangular die cut extending therethrough between the surfaces to define an I D card. A film laminate is adhesively secured to the rear surface and extends beyond the diecut on all sides thereof. The laminate also includes two film layers adhesively united in superposed relation with a first of the film layers being positioned adjacent the bottom surface and a second of the film layers being positioned remote from the bottom surfaces. The diecut extends through the first film layer but not the second film layer and the paper length top surface within the diecut is equipped with first and second printed indicia within the diecut. The first printed indicia relates to the sponsor of the I D card and the second printed indicia relating to the identity of the intended user of the I D card.

The invention also includes a method for making an I D card intermediate which include the steps of providing a two ply film laminate arranged in face-to-face relation with a rupturable adhesive therebetween and also providing a length of paper having opposed surfaces with printed indicia relating to an I D card sponsor on one of the surfaces. The steps further include adhesively uniting the laminate to the other of the surfaces to position a first of the film plies adjacent the other surface, diecutting the paper length and the first of the film plies to provide a generally rectangular closed perimeter cut defining an I D card, and imprinting printed indicia on the one surface. The imprinted indicia relates to the identity of the intended user of said I D card. Thus, the invention provides advantages both structurally and in the method of making over the prior art.

BRIEF DESCRIPTION OF DRAWING

The invention is described in conjunction with the accompanying drawing, in which FIG. 1 is a perspective view of a fragmentary string of form lengths constructed according to teachings of the invention;

FIG. 2 is an enlarged fragmentary cross sectional view taken along the sight line 2—2 as applied to FIG. 1; and FIG. 3 is a schematic side elevational view of apparatus practicing the method of the invention.

DETAILED DESCRIPTION

Generally speaking, the invention makes use of a business form (either sheeted or continuous with line holes) having one or more I D cards incorporated in it.

Referring to FIG. 1, the numeral 10 designates generally a string of interconnected business form lengths as at 11, 11a, 11b, etc. Each form length is defined between transverse lines of perforation as at 12 and may be equipped, at least along one longitudinal edge, with line holes as at 13.

The I D card is generally designated 14 and is defined by a closed perimeter of diecut 15 which generally defines a rectangular outline.

The form length 11 generally has two types of printed indicia thereon. One type of printed indicia designated 16 has to do with the sponsor of the card and may also be present as at 17 in one portion of the I D card 14. The second type of printed indicia is designated 18 and relates to the intended user of the card—the I D information—and this is normally only on the card itself.

The construction according to the invention makes use of the form length 11 as seen in FIG. 2 and has an upper surface 19 and a lower surface 20. Applied to the lower surface 20 is a pressure sensitive adhesive 21 which makes it possible to apply a laminate generally designated 22 to the surface 20 of the form 11. The laminate 22 includes first and second transparent films as at 23 and 24 joined together by a dry adhesive 25. This adhesive is readily rupturable to operate the film plies. Such a laminate is commercially available from 3-Sigma located at Columbia, S.C. under Product No. 90906-546. Such a laminate has been used in the past in connection with coupon-bearing business forms.

Also seen in FIG. 2 is the diecut 15 which is seen to extend from the top surface 19 of the form 11 down to but not through the bottom film 24. Thus, when the intended user's information is applied to the card, the card is conveniently removed and has a rear film as at 23 to stiffen the same. In many instances, it is desirable to provide at least two I D cards and this version is depicted in FIG. 1.

There are a number of advantages stemming from this construction including the card being made from the form so as to permit registration between the form and the I D card to be exact.

Secondly, any type of paper can be used to produce the form such as 20 pound bond, 100 pound tag, etc.

Thirdly, as pointed out above, the back of the card has the film 23 laminated thereto so that this helps make the cards strong and durable.

Fourthly, since the form is the card, the height difference between the form and the card is minimal—of the order of a mil or so and this helps when the forms are in a pack and when running on a laser printer.

INVENTIVE METHOD

In general, this makes use of a commercially available coupon stock applied in a patch on the back of the form using a pressure sensitive adhesive. The form is then diecut from the front side over this patch. The diecut is continuous with no bonds in it and the shape of the diecut is that of a typical I D card—usually with rounded corners. The diecut goes through all the sheets of material down to the last ply of film of the laminate 22. After the form is printed on any type printer, the I D card can be removed from the form.

The inventive method is shown in greater detail in FIG. 3 and reference is made thereto. Starting at the extreme right of FIG. 3, the numeral 10 again designates generally the length of paper which provides the form lengths 11 and also has surfaces 19 and 20. However, these surfaces are reversed from the showing in FIG. 2—the laminate patch 22 being applied to the upper surface as seen in FIG. 3. This is a matter of convenience—although normally applying operations are performed from above.

Above the horizontal path along which the paper web 10 travels is an unwind 26 which is equipped with coupon stock film, i.e., the laminate 22. Inasmuch as this is purchased commercially, it is equipped with the pressure sensitive adhesive 21 and overlying that is a release liner 27 which is continuously removed from the coupon stock emanating from the unwind 26. The no longer needed release liner 27 is then rewound into a roll 28 for disposition.

The laminate has the pressure-sensitive adhesive 23 facing upwardly and this is exaggerated at the right of FIG. 3 for ease of understanding. The web unwound from the parent roll 26 passes over a rotating vacuum roll 29 which is rotating faster than the web being unwound from the roll 26—there being a sliding contact between the web and the roll 29. Ranged next to the vacuum roll 29 is a cutoff roll 30 which is seen to sever the web and adhesive into discrete patches 22. Then, these are spaced longitudinally be virtue of the faster speed of the vacuum roll 29. The laminates 22 are adhered to the web 10 by virtue of the pressure-sensitive adhesive being in face-to-face contact with the web 10. Thereafter, the web encounters the diecutting station generally designated 31 and which includes an anvil roll 32 and a die roll 33. This provides the cutout after which the forms can be transversely perforated by the perforator generally designated 34 to define the across perforation lines 12.

Thereafter, the continuous form string may be zig-zag folded as at 35 and transported to a second site 35' where it is printed by printer 36 with the information specific to the intended user.

While in the foregoing specification a detailed description of an embodiment of the invention has been set down for the purpose of illustration, many variations in the details hereingiven may be made by those skilled in the art without departing from the spirit and scope of the invention.

I claim:

1. A method for making an I D card intermediate comprising performing at a first site the steps of providing a two ply film laminate arranged in face-to-face relation with a dry, rupturable adhesive therebetween, providing a length of paper having top and bottom surfaces with first printed indicia relating to an I D card sponsor on said top surface, adhesively uniting said laminate to said bottom surface to position a first of said film plies adjacent said bottom surface, diecutting said paper length and said first of said film plies to provide a generally rectangular closed perimeter cut defining an I D card having said first film ply attached thereto with said film laminate extending beyond said diecut on all sides thereof, performing at a second site the step of laser imprinting second indicia on said top surface relating to the identity of the intended user of said I D card with both said first and second indicia being within said diecut and removing said I D card and said first film by rupturing said dry adhesive.

2. An I D card intermediate comprising a length of paper having top and bottom surfaces and a generally rectangular diecut extending therethrough between said surfaces to define an I D card, a film laminate adhesively secured to said bottom surface and extending beyond the diecut on all sides thereof, said laminate including two film layers adhesively united in superposed relation with a first of said film layers being positioned adjacent said bottom surface and a second of said film layers being positioned remote from said bottom surface, said diecut extending through said first film layer but not said second film layer, said paper length top surface within said diecut being equipped with first and second printed indicia within said diecut, said first printed indicia relating to the sponsor of said I D card and said second printed indicia relating to the identity of the intended user of said I D card, said paper adhesive being interposed between said first and second film layers, said dry adhesive being rupturable upon exertion of a removal force on said I D card whereby said first film layer remains with said I D card when said I D card is removed from said paper length.

3. An I D card intermediate comprising a length of paper having top and bottom surfaces and a generally rectangular diecut extending therethrough between said surfaces to define an I D card, a film laminate adhesively secured to said bottom surface and extending beyond the diecut on all sides thereof, said laminate including two film layers adhesively united in superposed relation with a first of said film layers being positioned adjacent said bottom surface and a second of said film layers being positioned remote from said bottom surface, said diecut extending through said first film layer but not said second film layer, said paper length top surface within said diecut being equipped with first and second printed indicia within said diecut, said first printed indicia relating to the sponsor of said I D card and said second printed indicia relating to the identity of the intended user of said I D card, said paper length top surface outside said diecut also being equipped with said first printed indicia but not said second printed indicia, a dry adhesive being interposed between said first and second film layers, said dry adhesive being rupturable upon exertion of a removal force on said I D card whereby said first film layer remains with said I D card when said I D card is removed from said paper length.

* * * * *